United States Patent [19]

Hargreaves et al.

[11] Patent Number: 4,529,653
[45] Date of Patent: * Jul. 16, 1985

[54] FLEXIBLE, ASBESTOS-FREE GASKET MATERIAL

[75] Inventors: Brian Hargreaves, Manchester; Robert A. Lancaster, Littleborough; Noel C. McKenzie, Rochdale; John D. Crabtree, Burnley, all of England

[73] Assignee: T&N Materials Research Limited, Manchester, England

[*] Notice: The portion of the term of this patent subsequent to Jul. 16, 2002 has been disclaimed.

[21] Appl. No.: 549,441

[22] Filed: Nov. 7, 1983

[30] Foreign Application Priority Data

Nov. 12, 1982 [GB] United Kingdom ............... 8232346

[51] Int. Cl.³ .................. B32B 9/06; B32B 15/04; B65D 53/00
[52] U.S. Cl. .................. 428/450; 428/454; 428/463; 428/464; 524/35; 524/47; 524/445; 524/447; 524/449; 277/227; 277/DIG. 6; 106/DIG. 3; 162/142; 162/164.1; 162/177; 162/181.7; 162/181.8
[58] Field of Search ............ 524/35, 445, 47, 447, 524/449, 492, 606; 106/DIG. 3, DIG. 4, 204; 501/95; 428/237, 283, 450, 454, 463, 464, 457; 277/227, 233, 234, DIG. 6; 162/142, 164.1, 177, 181.7, 181.8, 181.9

[56] References Cited

U.S. PATENT DOCUMENTS

| 3,124,502 | 3/1964 | Radke ........................... 277/227 |
| 3,767,211 | 10/1973 | Amphlett ................. 277/227 X |
| 4,176,097 | 11/1979 | Fox et al. ................. 524/35 X |
| 4,317,575 | 3/1982 | Cavicchio ................ 524/35 X |
| 4,431,698 | 2/1984 | Case et al. ............ 277/227 X |

OTHER PUBLICATIONS

Chem. Abstracts, vol. 93, 73257u, (1980), Tracy et al., p. 73259.

Primary Examiner—Joseph L. Schofer
Assistant Examiner—Fred Teskin
Attorney, Agent, or Firm—Cushman, Darby & Cushman

[57] ABSTRACT

Non-asbestos flexible sheet material suitable for use in gaskets for the exhaust manifold of an internal combustion engine is made by dewatering on a water-permeable conveyor a layer of aqueous slurry and compressing and drying the dewatered layer, the aqueous slurry employed being one that contains the following ingredients in the following proportions by dry weight:

ball clay: 25–44%
non-fibrous layer silicate: 25–40%
graphite: 10–30%
cellulose fibres: 3–15%
synthetic rubber: 1–10%
starch: 1–5%.

3 Claims, No Drawings

FLEXIBLE, ASBESTOS-FREE GASKET MATERIAL

This invention relates to flexible sheet material suitable for use in the manufacture of gaskets, particularly gaskets for the exhaust manifold of an internal combustion engine.

Such material is commonly made of fibres of asbestos bound together with a binder, which is usually starch. The material is made with the use of conventional paper-making machinery such as a Fourdrinier machine, and is in fact often called 'asbestos paper'. In the manufacture of exhaust manifold gaskets, asbestos paper (usually of thickness in the range 0.3–1.3 mm) is drawn from a reel and, with a sheet of the metal (eg. tinplate) which is to form the support element of the gasket, is passed between rollers which urge the two sheets into engagement with one another, as by pushing shallow tangs on the metal sheet into the paper. From the composition sheet thus formed blanks are cut in the desired shape. Composite sheet as just described is usually made in three forms: single-sided (one layer of metal support, and one layer of paper); double-sided paper; and double-sided metal. The paper employed is ordinarily made so that it will serve for all three forms of gasket.

The present invention provides paper not having a basis of asbestos, but with the properties required for use in exhaust manifold gaskets, and in particular the flexibility and tensile strength to withstand being made up into gaskets without losing its integrity, the ability to withstand exhaust manifold temperatures (600°–700° C.), and the ability to retain its sealing capacity despite the constant fluctuations in temperature to which it is subjected in use. Additionally, it is desirable that the paper should be easily releasable from the exhaust manifold flange when a new exhaust system is to be fitted.

The non-asbestos flexible sheet material of the invention is made by a convenional paper-making process, but with the employment of an aqueous paper-making slurry of particular ingredients used in particular proportions. The conventional process can be summarised as one in which an aqueous slurry of the various ingredients of the paper is progressively dewatered as a layer on a water-permeable conveyor, and the dewatered layer is subsequently compressed and dried. The new aqueous paper-making slurry employed in the process of the invention contains the following ingredients in the following proportions by dry weight:

ball clay: 25–44%
non-fibrous layer silicate mineral: 25–40%
graphite: 10–30%
cellulose fibres: 3–15%
synthetic rubber: 1–10%
starch: 1–5%

The ball clay, which is employed in the unfired state, is the ingredient which gives the finished paper its basic cohesiveness combined with flexibility. Additionally, its presence greatly assists the formation of a layer of good 'green strength' on the water-permeable conveyor of the paper-making machine. The preferred proportion of ball clay is 30–40% by dry weight of the aqueous slurry. The non-fibrous layer silicate mineral, which is suitably mica or chlorite, imparts heat-resistance to the finished paper. The preferred proportion of silicate is 25–35% by dry weight.

The graphite gives good release properties to the finished paper. The preferred proportion of graphite is 15–25% by dry weight.

The function of the cellulose fibres is to assist the formation of a web on the water-permeable conveyor of the paper-making machine. The cellulose fibres are suitably employed at a freeness of 40°–90° Schopper Riegler. The preferred proportion of cellulose is 5–12% by dry weight.

The starch, which is preferably farina starch, and the synthetic rubber both act as binders for all the other ingredients. Additionally the starch assists flocculation before the dewatering stage of manufacture, and the synthetic rubber improves the flexibility of the finished paper. The synthetic rubber is preferably a nitrile rubber, such as an acrylonitrile-butadiene copolymer, suitably of butadiene content 25–75% by weight. In preparing the paper the synthetic rubber is incorporated in dispersed form in the aqueous slurry which is progressively dewatered, conveniently by the use of a commercially available latex containing a dispersing agent. The preferred proportion of synthetic rubber by dry weight of the slurry is 1–5%.

The slurry preferably also contains a small proportion, suitably in the range 1–10%, preferably 1–5%, by weight of solids content, of rayon fibres to impart flexibility and crack-resistance to the paper on the drying cylinders of the paper-making machine, and also to impart additional strength to the finished paper.

The density of the paper produced will ordinarily be in the range 800–1500 kg/m$^3$.

The invention is further illustrated by the following Examples.

EXAMPLE 1

This Example illustrates the preparation of a non-asbestos gasket paper from an aqueous slurry of the following composition:

|  | % by weight |
| --- | --- |
| ball clay | 35 |
| chlorite | 30 |
| graphite | 20 |
| cellulose fibres | 7.5 |
| starch | 2 |
| nitrile rubber | 3 |
| rayon fibres | 2.5 |

A. Preparation of Slurry i Lapponia pulp (bleached softwood sulphate pulp) in sheet form was made into an aqueous slurry of solids content about 3% by weight and treated in a disc refiner until its freeness was 80° Schopper Riegler.

ii The pulp of i (750 g dry weight = 25 kg wet weight) was added to 113.5 liters of water at 60° C. in a mixing tank, and the diluted pulp was agitated vigorously for 1 minute. There were then successively added, with vigorous stirring:

ball clay (surface area by nitrogen absorption: 20 m$^2$/g; particle size such that less than 0.6% by weight was retained on a sieve of aperture 125 μm diameter), graphite (natural graphite, of carbon content 98%, ash content 2%; particle size such that at least 96% passed a sieve of aperture 90 μm diameter), chlorite (nominally 98% passing a sieve of aperture 250 μm diameter), and, after a further 5 minutes agitation, a further 159 liters of warm water was added, followed by rayon fibres (3 denier, chopped to 6 mm fibre length) at reduced agitation, farina starch (5% aqueous solution, prepared by heating at 95° C. for 5–10 minutes).

Finally, there was added a commercially available aqueous acrylonitrile-butadiene copolymer latex (pH 9.5–12; solids content 30–34%; acrylonitrile content of copolymer, 33%) diluted with 5 times its own volume of water.

iii The pH of the slurry in the mixer was then reduced to about 4.5 by the addition of paper-makers alum (aluminum sulphate). The supernatant liquid that remained when stirring was stopped was clear, indicating that the dispersed rubber particles of the latex had all been precipitated onto the cellulose fibres and the fine particles of ball clay, graphite and chlorite. A further 181.5 liters of water at 60° C. was then added with stirring for 3 minutes.

B. Preparation of Paper

The slurry of A above was made into flexible sheet material in an entirely conventional way, using conventional anionic polyacrylamide flocculating agent and anti-foaming agent, on a Fourdrinier flat wire paper machine, such as is described in chapters 10 and 11 of "Paper and Board Manufacture" by Julius Grant, James H. Young and Barry G. Watson (Publishers; Technical Division, The British Paper and Board Industry Federation, London 1978). The slurry is progressively dewatered as it travels on the water-permeable conveyor of the machine, and the dewatered material is consolidated by pressing between rollers. The sheet material thus formed is dried on heated cylinders and wound into reels.

The properties of various flexible sheet material obtained from the slurry of A were:

| Thickness mm | 0.38 | 0.5 | 0.86 | 1.1 |
|---|---|---|---|---|
| Mass/unit area g/m$^2$ | 395 | 555 | 1015 | 1155 |
| Density kg/m$^3$ | 1040 | 1110 | 1180 | 1050 |
| Tensile strength | | | | |
| Machine direction MPa | 5.1 | 5.1 | 5.8 | 6.0 |
| Cross direction MPa | 4.0 | 4.5 | 4.2 | 4.2 |
| Compression at 6.89 MPa % | 27 | 23 | 23 | 26 |
| Recovery from Compression % | 14 | 15 | 17 | 17 |
| Passed Flexibility Test | Yes | Yes | Yes | Yes |

To pass the flexibility test referred to, a specimen of paper (50 mm×230 mm, with the 230 mm side parallel to the grain) should show no evidence of breaking when bent through 180° around a mandrel of 50 mm diameter, with use of just enough force to keep the specimen in contact with the mandrel.

EXAMPLE 2

Following generally the procedure of Example 1, non-asbestos papers were made from an aqueous slurry of the composition

| | % by weight |
|---|---|
| ball clay | 35 |
| mica | 30 |
| graphite | 20 |
| cellulose fibres | 10 |
| starch | 2 |
| nitrile rubber | 3 |

The graphite employed differed from that of Example 1 in being coarser (at least 20% of particles were retained by a sieve of aperture diameter 106 μm) and the rubber latex was a styrene-butadiene-acrylonitrile copolymer latex of pH 10.3, solids content 40%, butadiene content of copolymer, 55%. The mica employed was muscovite mica, passing a sieve of aperture 180 μm diameter.

The properties of two flexible sheet materials made were:

| Thickness mm | 0.75 | 1.15 |
|---|---|---|
| Mass/Unit area g/m$^2$ | 716 | 1105 |
| Density kg/m$^3$ | 955 | 961 |
| Tensile strength | | |
| Machine direction MPa | 3.8 | 3.2 |
| Cross direction MPa | 2.6 | 2.4 |
| Compression at 6.89 MPa % | 30 | 29 |
| Recovery from Compression % | 13 | 12 |
| Passed Flexibility Test | Yes | Yes |

We claim:

1. Non-asbestos flexible sheet material made by dewatering on a water-permeable conveyor a layer of aqueous slurry and compressing and drying the dewatering layer, the aqueous slurry employed being one that contains the following ingredients in the following proportions by dry weight:
 ball clay: 25–44%
 mica or chlorite: 25–40%
 graphite: 10–30%
 cellulose fibers: 3–15%
 synthetic nitrile rubber: 1–10%
 starch: 1–5%.

2. Non-asbestos flexible sheet material according to claim 1, in which the slurry also contains rayon fibers, in an amount forming 1–10% by dry weight of the slurry.

3. A gasket comprising non-asbestos flexible sheet material according to claim 1 secured to a metal support.

* * * * *